A. ANDERSON.
DRIVE MECHANISM.
APPLICATION FILED DEC. 19, 1913.

1,178,120.

Patented Apr. 4, 1916.

WITNESSES

INVENTOR
AXEL ANDERSON
BY
ATTORNEYS

UNITED STATES PATENT OFFICE.

AXEL ANDERSON, OF ST. PAUL, MINNESOTA, ASSIGNOR TO RUSSELL GRADER MANUFACTURING COMPANY, OF MINNEAPOLIS, MINNESOTA, A CORPORATION.

DRIVE MECHANISM.

1,178,120.      Specification of Letters Patent.      Patented Apr. 4, 1916.

Application filed December 19, 1913. Serial No. 807,622.

*To all whom it may concern:*

Be it known that I, AXEL ANDERSON, citizen of the United States, resident of St. Paul, county of Ramsey, State of Minnesota, have invented certain new and useful Improvements in Drive Mechanisms, of which the following is a specification.

The invention relates to drive mechanisms and particularly to that type used in connection with a traction machine, the object of the invention being to hold the gear driven from a traction wheel in engagement with the pinion of a driving shaft which extends to the operating mechanism of the machine.

The invention consists generally in various constructions and combinations, all as hereinafter described and particularly pointed out in the claims.

Figure 1:
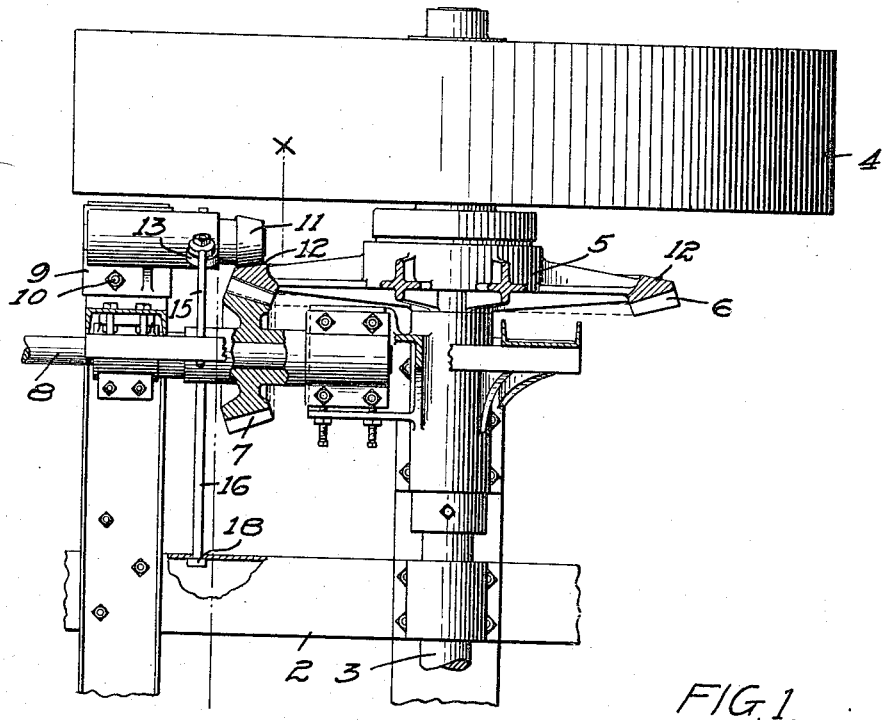
Figure 3:
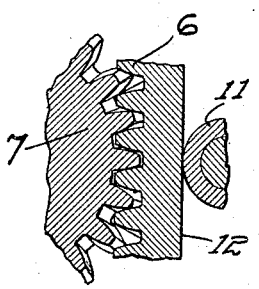
Figure 2:
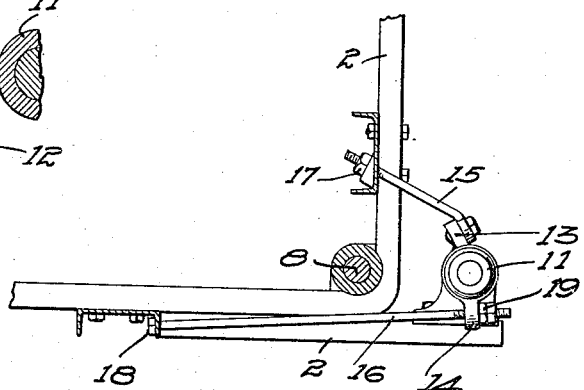

In the accompanying drawings forming part of this specification, Figure 1 is a plan view, partially in section, of a driving mechanism embodying my invention. Fig. 2 is a sectional view on the line $x-x$ of Fig. 1, Fig. 3 is a detail sectional view through a drive mechanism.

In the drawing, 2 represents the frame of a machine, in this case a portion of a grading machine, though the invention may be applied to other types of machines.

3 is an axle, journaled in suitable bearings on the frame 2 and provided with a traction wheel 4 and a gear wheel 5, which has the usual ratchet drive connection with the wheel 4 to compensate for the difference in travel of the traction wheels in turning. This being a common construction, I have not thought it necessary to illustrate it in detail herein. The wheel 5 has a beveled gear face 6 meshing with the teeth of a beveled pinion 7 on a driven shaft 8 that is journaled in suitable bearings on the frame and extends to the mechanism to be operated thereon. This shaft is driven from the traction wheel 4. Under the strain of operating the mechanism under heavy load, the wheel 5 might be twisted or bent sufficiently so that its teeth would not fairly engage the teeth of the pinion. To obviate this objection I provide a bracket 9 pivoted at 10 on the frame 2 and provided with an anti-friction roller 11 having a beveled face to bear on the corresponding face 12 of wheel 5. This bracket is free to swing on its pivot and is provided with lugs 13 and 14 on opposite sides thereof, and rods 15 and 16 pass through said lugs and through parts of the frame 2, the rod 15 being threaded on the end which passes through the frame and provided with an adjusting nut 17 and the rod 16 having a head 18 bearing on said frame and adjusting nuts 19 at its opposite end engaging the lug 14. By adjusting these nuts the rods 15 and 16 may be tightened or loosened, for the purpose of increasing or decreasing the pressure of the anti-friction roll 11 on the bearing surface 12 of the wheel 5 and thereby the wheel is held securely in the proper alinement and in engagement with the pinion 7. In this way the gears are held in proper and positive mesh with one another and there will be no interruption in the operation of the mechanism of the machine under varying conditions of the load.

In various ways the details of construction herein shown and described may be modified and still be within the scope of my invention.

I claim as my invention:

1. The combination with a frame and axle journaled therein and having a traction wheel, of a gear mounted on said axle and having a toothed face, a driven shaft mounted on said frame at right angles substantially to said axle, a pinion mounted on said shaft and meshing with the teeth of said gear, said gear having a surface on the opposite side thereof from said teeth, a bracket pivoted on said frame, a roll mounted on said bracket and arranged to bear on the surface of said gear, and rods connected with said bracket and with said frame.

2. The combination, with a frame and axle journaled therein and having a traction wheel, a gear mounted on said axle and having a beveled toothed face, a driven shaft mounted on said frame at right angles substantially to said axle, a pinion mounted on said shaft and meshing with the teeth of said gear, said gear having a beveled surface on the opposite side thereof from said teeth, a bracket pivoted on said frame, an anti-friction roll mounted on said bracket and arranged to bear on the beveled surface of said gear, and rods pivotally connected with said bracket and adjustably connected with said frame, whereby the movement of said rods will increase or decrease the pressure of said anti-friction wheel on said gear, for the purpose specified.

3. The combination, with a frame and axle journaled therein, of a gear mounted on said axle and provided with a toothed face, a driven shaft mounted at right angles substantially to said axle, a pinion on said shaft meshing with the teeth of said gear, a roll pivotally supported on said frame to bear on the surface of said gear, and means adjustably connecting said roll with said frame for increasing or decreasing the pressure thereof on said gear.

In witness whereof, I have hereunto set my hand this 2d day of December 1913.

AXEL ANDERSON.

Witnesses:
GENEVIEVE E. SORENSEN,
EDWARD A. PAUL.

Copies of this patent may be obtained for five cents each, by addressing the "Commissioner of Patents, Washington, D. C."